(12) United States Patent
Aoyagi et al.

(10) Patent No.: US 7,919,941 B2
(45) Date of Patent: Apr. 5, 2011

(54) SEMICONDUCTOR POWER CONVERTER

(75) Inventors: Shigehisa Aoyagi, Hitachi (JP);
Yoshitaka Iwaji, Hitachinaka (JP);
Kazuaki Tobari, Hitachiota (JP);
Kiyoshi Sakamoto, Hitachinaka (JP);
Donsheng Li, Hitachi (JP)

(73) Assignees: Hitachi, Ltd., Tokyo (JP); Hitachi Car Engineering Co., Ltd., Ibaraki (JP); Hitachi Industrial Equipment Systems Co., Ltd., Tokyo (JP)

(*) Notice: Subject to any disclaimer, the term of this patent is extended or adjusted under 35 U.S.C. 154(b) by 410 days.

(21) Appl. No.: 12/193,209

(22) Filed: Aug. 18, 2008

(65) Prior Publication Data

US 2009/0058331 A1 Mar. 5, 2009

(30) Foreign Application Priority Data

Aug. 27, 2007 (JP) ................................ 2007-219195

(51) Int. Cl.
*H02P 23/00* (2006.01)
(52) U.S. Cl. ........ 318/255; 318/609; 318/722; 318/800; 322/27
(58) Field of Classification Search .................. 318/255, 318/716, 722, 609, 800; 322/27; 363/97
See application file for complete search history.

(56) References Cited

U.S. PATENT DOCUMENTS

| | | | | |
|---|---|---|---|---|
| 6,556,464 | B2 * | 4/2003 | Sakai et al. | 363/132 |
| 6,894,450 | B2 * | 5/2005 | Cheng et al. | 318/400.09 |
| 6,909,290 | B2 * | 6/2005 | Imai et al. | 324/545 |
| 6,937,488 | B2 * | 8/2005 | Eguchi | 363/97 |
| 6,949,902 | B2 * | 9/2005 | Nakayama et al. | 318/432 |
| 7,489,097 | B2 * | 2/2009 | Fu et al. | 318/400.01 |
| 2003/0214266 | A1 * | 11/2003 | Cheng et al. | 318/716 |
| 2004/0066205 | A1 * | 4/2004 | Imai et al. | 324/709 |
| 2004/0232877 | A1 * | 11/2004 | Kawaji et al. | 318/802 |
| 2004/0252533 | A1 * | 12/2004 | Eguchi | 363/97 |
| 2005/0093519 | A1 * | 5/2005 | Nakayama et al. | 322/27 |
| 2005/0218862 | A1 * | 10/2005 | Huggett et al. | 318/722 |

FOREIGN PATENT DOCUMENTS

JP 06-189578 7/1994

* cited by examiner

*Primary Examiner* — Paul Ip
(74) *Attorney, Agent, or Firm* — Antonelli, Terry, Stout & Kraus, LLP.

(57) ABSTRACT

A semiconductor power converter includes a power converter for converting direct current to three-phase alternating current or vice versa; a means for detecting a current in an alternating current side of the power converter; a means for providing a current reference in the alternating current side of the power converter; a current controller for calculating a voltage reference in the alternating current side of the power converter to match the current reference and a value of the detected current; and a pulse width modulation means for controlling the power converter through pulse width modulation based on the voltage reference, wherein the current reference is used in place of the value of the detected current for at least one phase current among three phase currents in the alternating current side.

16 Claims, 12 Drawing Sheets

US 7,919,941 B2

SEMICONDUCTOR POWER CONVERTER

CLAIM OF PRIORITY

The present application claims priority from Japanese patent application serial No. 2007-219195, filed on Aug. 27, 2007, the content of which is hereby incorporated by reference into this application.

FIELD OF THE INVENTION

The present invention relates to a method for detecting alternating current in a semiconductor power converter.

BACKGROUND OF THE INVENTION

In a semiconductor power converter, a semiconductor device such as IGBT is driven by a pulse-width modulated switching signal for a desired voltage reference (hereinafter, the pulse-width modulation is abbreviated as PWM). This PWM causes an alternating current to have a waveform in which a ripple component caused by the switching is superimposed on its fundamental wave component. In order to control the current, it is preferable to detect the current by extracting only the fundamental wave component with the least effect of the ripple component. Patent Document 1 suggests a technique to detect an alternating current, using an alternating current transducer, at the point of time corresponding to an approximate midpoint between zero voltage intervals (intervals when the AC output voltage becomes zero).

In Patent Document 1, currents of three phases (U-phase, V-phase, and W-phase) are successively detected, based on the observation that the point of time when the amplitude of a triangle-wave carrier signal (a carrier wave of PWM) reaches its maximum or minimum, corresponds to an approximate midpoint between zero voltage intervals.

Patent Document 1: Japanese Patent Laid-open No. Hei 6 (1994)-189578

SUMMARY OF THE INVENTION

In the method according to Patent Document 1, each phase in the three-phase alternating current is successively selected and its current is detected using only one A/D converter and a multiplexer. For this reason, the AC currents of the three phases cannot be detected at the same time, generating a slight time lag between each detection. This time lag would not be a problem as long as the frequency of the fundamental wave component, i.e. the motor drive frequency is low enough. However, it will become an error of phase as the drive frequency gets higher. In the future, the motor drive frequency is likely to be higher; therefore, the effect of this detection error cannot be ignored. In addition, the alternating current transducer used in the method according to Patent Document 1 raises the cost of the system too high to meet an increasing demand for cost reduction. For the same reason, it is not beneficial to adapt a method which requires more than one A/D converter to simultaneously detect alternating currents.

An object of the present invention is to keep the detection error of phase minimal and to achieve a motor drive which is stable even in a high-speed region.

To solve the above problems, a semiconductor power converter in the present invention includes: a power converter for converting direct current to three-phase alternating current or vice versa; a means for detecting a current in an alternating current side of the power converter; a means for providing a current reference in the alternating current side of the power converter; and a current controller for calculating a voltage reference in the alternating current side of the power converter to match the current reference and a value of the detected current; and a pulse width modulation means for controlling the power converter through pulse width modulation based on the voltage reference, wherein, the current reference is used in place of the value of the detected current for at least one phase current among the three phase currents in the alternating current side.

The present invention can keep a detection error of phase minimal, and achieve a motor drive which is stable even in a high-speed region.

DESCRIPTION OF THE PREFERRED EMBODIMENTS

With reference to the accompanying figures, the present invention is described in detail below.

Embodiment 1

Figure 1:
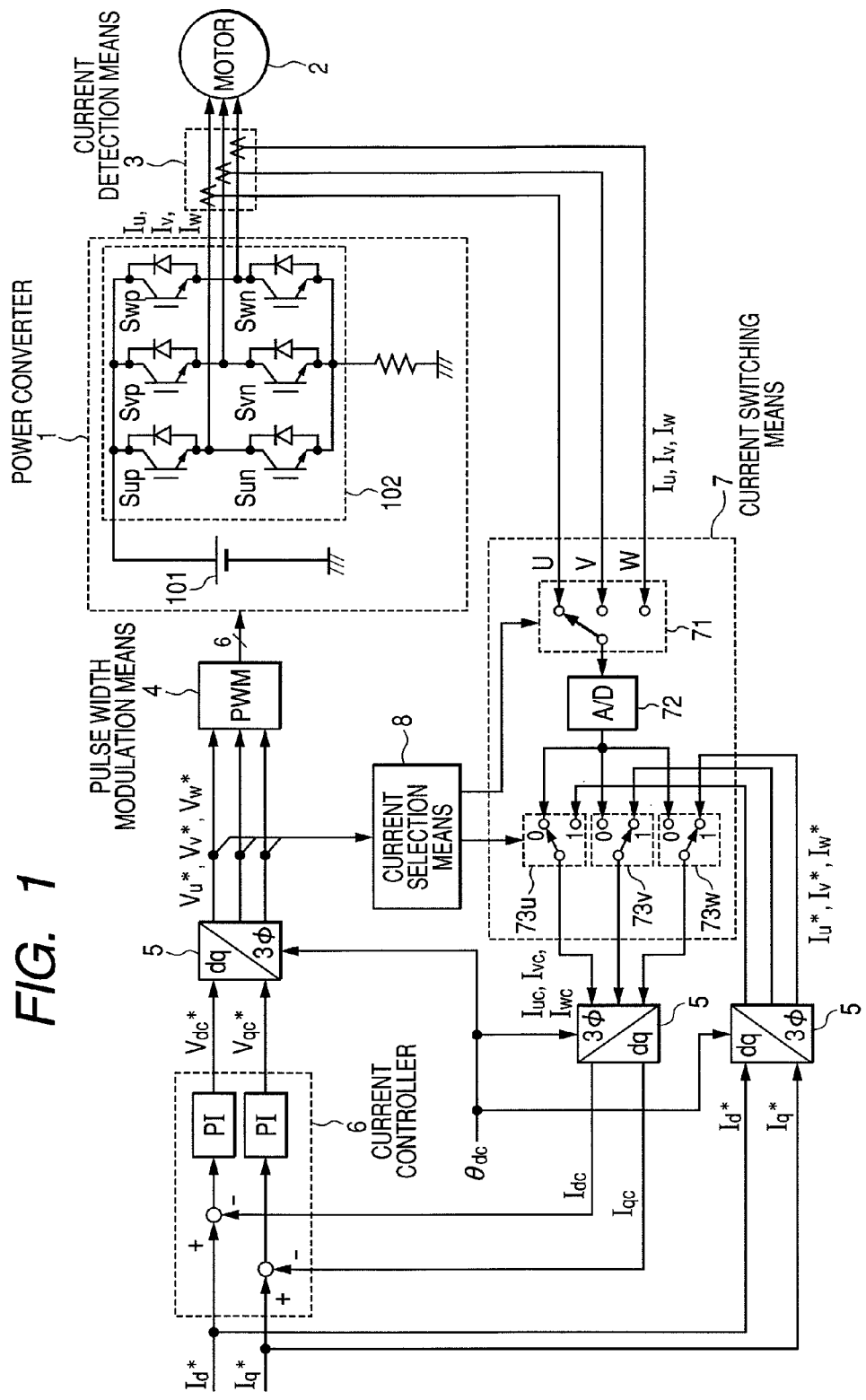
FIG. 1 is a block diagram of Embodiment 1.

The block diagram of FIG. 1 describes a first embodiment of the present invention. A motor drive system in FIG. 1 includes a power converter 1, a motor 2 driven by the power converter 1, a current detection means 3 for detecting alternating current for the motor, a pulse width modulation means 4 for performing PWM (Pulse Width Modulation) based on a voltage reference for the alternating current, a coordinate transformation means 5 for transforming a d-q coordinate axis to and from a three-phase alternating current coordinate axis, a current controller 6 for providing the voltage reference, a current switching means 7, and a current selection means 8; the current switching means 7 and the current selection means 8 characterize the present invention.

The coordinate transformation means 5 transforms the d-q coordinate axis to and from the three-phase AC coordinate axis through a two-phase AC coordinate axis. The transformation requires a rotor position (phase) for the motor 2, and generally uses detected phase $\theta_{dc}$ obtained by a rotor position sensor (e.g. an encoder or a resolver). The detected phase $\theta_{dc}$ may be obtained not by using the rotor position sensor, but by position sensorless control, in which $\theta_{dc}$ is calculated from a state quantity of the power converter 1.

Equation 1 shows a transform matrix $C_{uvw\text{-}\alpha\beta}$ from three-phase AC coordinate uvw to two-phase AC coordinate $\alpha\beta$, and Equation 2 shows a transform matrix $C_{\alpha\beta\text{-}dq}$ from the two-phase AC coordinate $\alpha\beta$ to the d-q coordinate. Both equations are used in the coordinate transformation means 5. Equation 1 and Equation 2 can transform coordinates to and from each other by using an inverse matrix.

$$C_{uvw-\alpha\beta} = \begin{bmatrix} 1 & -\frac{1}{2} & -\frac{1}{2} \\ 0 & \frac{\sqrt{3}}{2} & -\frac{\sqrt{3}}{2} \end{bmatrix} \quad \text{Equation 1}$$

$$C_{\alpha\beta-dq} = \begin{bmatrix} \cos\theta_{dc} & \sin\theta_{dc} \\ -\sin\theta_{dc} & \cos\theta_{dc} \end{bmatrix} \quad \text{Equation 2}$$

The pulse width modulation means 4 generates a switching signal for driving the power converter 1 by comparing voltage references for three phases and a carrier signal. The power converter 1 consists of a DC power source 101 and a power circuit 102, and outputs three-phase AC voltage by switching six switching elements, i.e. semiconductor elements Sup-Swn in the power circuit 102, based on the switching signal. As a result, sinusoidal current flows to the motor. The current detection means 3 can detect three-phase current flowing to the motor 2 by using a current transformer, etc.

The detected current is transformed into currents $I_{dc}$ and $I_{qc}$ on the d-q axis by the coordinate transformation means 5, and controlled to match their reference currents $I_d^*$ and $I_q^*$ respectively by the current controller 6. If $\theta_{dc}$ matches the excitation axis of the motor 2 (the axis with a magnet if the motor is a magnet motor), $I_{qc}$ becomes a torque current component and $I_{dc}$ becomes an excitation current component, allowing vector control to be performed.

Next, the current switching means 7 and the current selection means 8, both of which characterize the present invention, are described. In FIG. 1, the current selection means 8 determines the current to input into the controller (current of which phase in the three phases to input) based on the magnitude of voltage references $V_u^*$, $V_v^*$, and $V_w^*$, and controls a phase switch 71 and detected-value/reference switches 73u, 73v, and 73w. The phase switch 71 selects only one phase among three phases, a current of which is inputted into the controller, and transforms the current to a digital quantity through an A/D converter 72. Meanwhile, current references $I_u^*$, $I_v^*$, and $I_w^*$ on an AC axis are created from current references $I_d^*$ and $I_q^*$ on the d-q axis. The detected-value/reference switches 73u, 73v, and 73w switch between the use of the detected current value read by the A/C converter and the use of the phase current reference used instead of the detected current value. In the embodiment of FIG. 1, the detected current value is used for only one phase and the current references are used in place of the detected current values for the other two phases.

Figure 2:
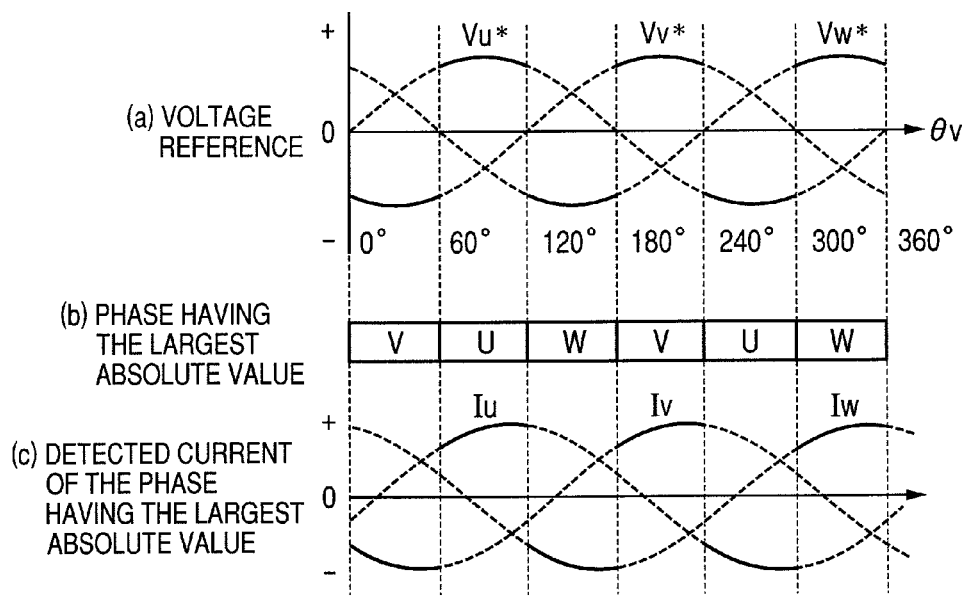
FIG. 2 is a relationship diagram of phases having the largest absolute value.

At this time, the current selection means 8 selects the phase having the largest absolute value of voltage reference, and only the current of which is inputted into the controller as the detected current value. FIG. 2 shows a relationship between a phase having the largest absolute value of voltage and the corresponding phase current. "The current of the phase having the large absolute value of phase voltage" can be considered as "the current of the phase most contributing to active current." In FIG. 2, the current phase is slightly lagging (power factor is slightly low), but detecting the current of this phase is equivalent to preferentially detecting the active current which is important in controlling the converter. Hence, it is possible to control the motor output by detecting only the current of the phase having the largest absolute value.

Next describes the advantages of the present invention compared to a conventional technology.

Figure 3:
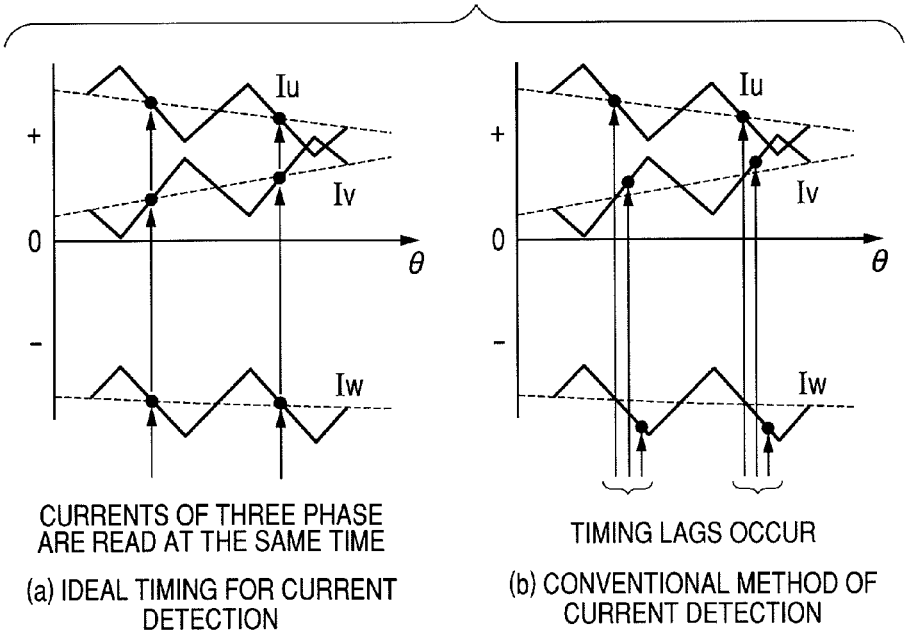
FIG. 3 is a relationship diagram of current ripples and detection timings.
Figure 4:
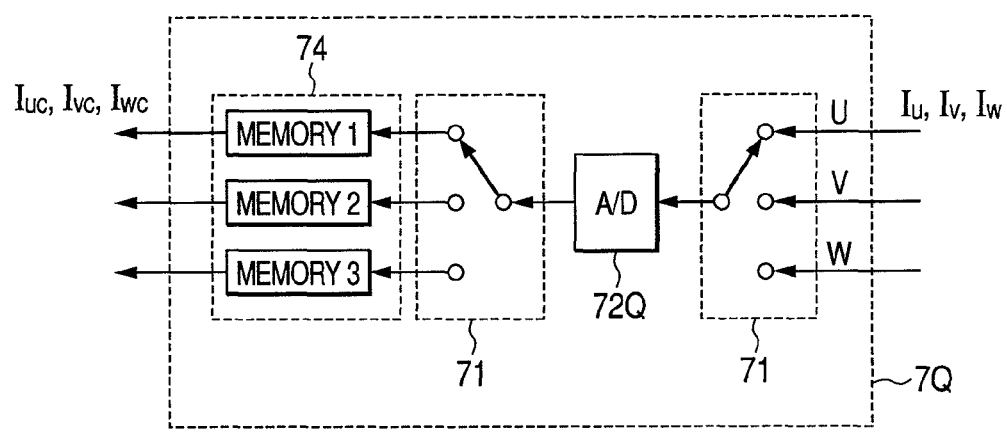
FIG. 4 is a block diagram of a current detection circuit.

FIG. 3 is a partially enlarged view of phase currents of a motor. An actual motor current has triangle-wave-shaped ripples as shown in the figure. These ripples are generated by switching of the power converter 1. Ideally, the currents of three phases should be sampled at the same time at a certain timing (the timing corresponding to a peak of the carrier wave when performing PWM) for inputting into the controller (FIG. 3[a]). Unfortunately, a current detection circuit in general is configured as the one shown in FIG. 4. A single A/D converter sequentially transforms the current of each phase into a digital quantity and stores the output in a memory 74. For this reason, the currents of the three phases cannot be sampled at the same time, creating a subtle timing lag (FIG. 3[b]). This lag is not a problem as long as the motor drive frequency is low enough; however it will eventually become an error of phase as the drive frequency gets higher. Rotation speed of a motor needs to be increased for the size and weight reduction of the motor; therefore in the future, the motor drive frequency is likely to be higher. In that case, the conventional detection method will have a problem of such detection error.

On the other hand, the present invention in FIG. 1 addresses this problem by detecting only the phase which most contributes to the output (the phase having the largest absolute value of voltage reference), among three phases in the three-phase current, and replacing the current values of the other two with current reference values. As a result, the motor can be stably driven even in a high-speed region.

In this embodiment, only the current of the phase having the largest absolute value of voltage reference is detected, and the others' are replaced with current references. Although this method is preferable, an object of the present invention can be also achieved by detecting the current of the phase other than the phase having the largest absolute value of voltage reference and replacing the others' with current reference values.

Furthermore, it is also possible to detect the current of only one phase; replace, with a current reference value, the current of at least one of the other phases only; and obtain the current of the last phase from the detected value and the current reference value.

Figure 5:
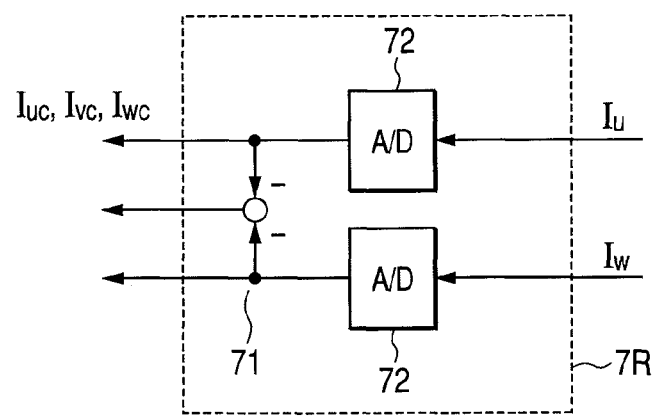
FIG. 5 is a block diagram of a conventional current detection circuit.

There is another conventional method, as shown in FIG. 5, in which currents of two phases in three-phase alternating current are detected at the same time using two A/D converters, and the current of the remaining phase is obtained by a mathematical operation. However, in this case, two expensive A/D converters are required, increasing the cost of the system. In addition, the circuit area is undesirably increased, so is the power consumption. The present invention in FIG. 1 has no such problems.

According to the present invention, an error of phase in the detection process can be kept minimal, and a stable motor drive even in a high-speed region can be achieved.

Embodiment 2

Figure 6:
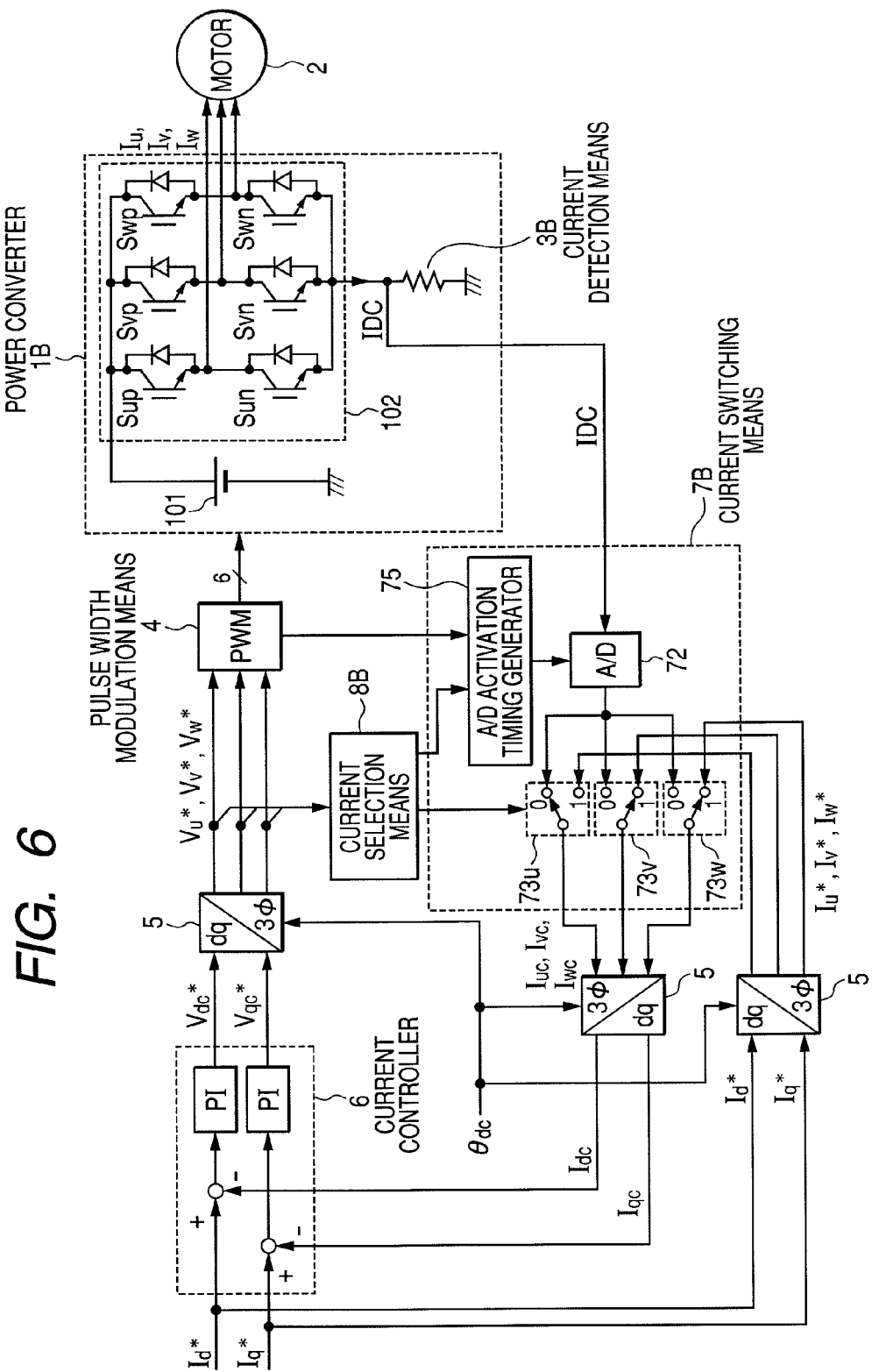
FIG. 6 is a block diagram of Embodiment 2.

The block diagram of FIG. 6 describes a second embodiment of the present invention. Most of the components in FIG. 6 are the same as those in FIG. 1. New features in this embodiment are a current detection means 3B, a current switching means 7B, and a current selection means 8B.

In this embodiment, the current detection means 3 in FIG. 1 is deleted, and the current detection means 3B, which is a single shunt resistor, is used to detect DC bus current IDC in the power converter 1. This embodiment works if the DC bus current IDC is detected, therefore the voltage at both ends of the shunt resistor may be used, as shown in the figure, or a current transducer using a hall element (DCCT) may be used for the detection.

Figure 7:
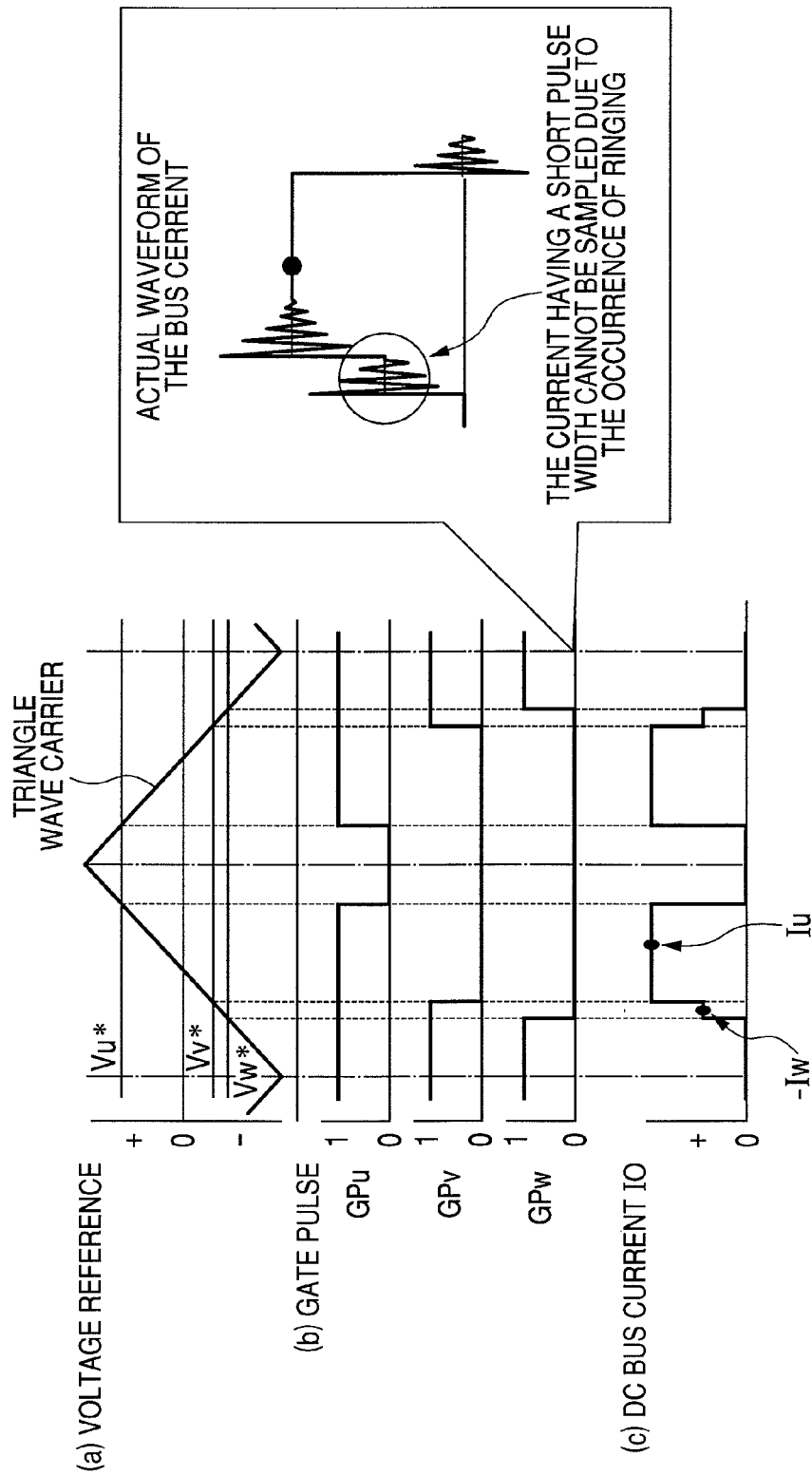
FIG. 7 is a relationship diagram of PWM and a DC bus current.

It is known in general that if the DC bus current IDC is detected, currents $I_u$, $I_v$, and $I_w$ in the AC side of the motor can be also detected. First of all, its principle is briefly described. FIG. 7 shows an aspect of PWM by comparing a triangle-wave carrier and three-phase AC voltage references $V_u^*$, $V_v^*$, and $V_w^*$.

The gate pulse signal shown in FIG. 7(b) is obtained by comparing the $V_u^*$, $V_v^*$, and $V_w^*$ and the triangle-wave carrier signal in FIG. 7(a). The gate pulses which drive the power converter 1 are GPu, GPv, and GPw for U-phase, V-phase, and W-phase respectively, and each phase performs exclusive control in which the upper-arm (such as Sup) turns on at "1" and the lower-arm (such as Sun) turns on at "0". FIG. 7(c) shows the waveform of the DC bus current IDC. Under this condition, $I_u$ and $I_w$ occur in the IDC waveform in a time-divided manner.

The phase currents which can be detected in the DC bus are the current of the phase with the highest voltage reference (U-phase in FIG. 7 since $V_u^*$ is the highest) and the current of the phase with the lowest voltage reference (W-phase in FIG. 7 since $V_w^*$ is the lowest). As shown in FIG. 7(c), these phase currents in the motor occur in a time-divided manner, making it possible to detect the currents of the two phases if the DC bus current is sampled at the right timing of the U-phase current flow and the W-phase current flow. An A/D activation timing generator 75 triggers this timing.

Unfortunately, there is a big challenge for the method of detecting the phase currents in the DC bus. As illustrated in the right side of FIG. 7, the actual DC bus current shows "ringing" generated by switching. Sampling of the current while it's in this ringing state causes a detection error. In addition, a pulse rise time, pulse fall time, dead time, etc. must be ensured. For this reason, it will be difficult to detect a current if its pulse width is short. (In FIG. 7, the current-carrying width of W-phase is too short for accurate detection.) Some solutions have been proposed to solve this problem, such as decreasing the frequency of the carrier, or increasing the current-carrying period by intentionally widening the pulse width. However, these solutions have their own disadvantages such as: decreasing the carrier causes an increase in electromagnetic noise, and widening the pulse width causes an increase in current distortion and torque ripple.

This embodiment can solve the above problems.

The current detection means 8B in FIG. 6 selects the phase having the largest absolute value of voltage reference, and the timing when the phase occurs in the DC bus current is set in the A/D activation timing generator 75. At the same time, the detected-value/reference switch operates to make the phase having the largest absolute value select the detected current and to make the other phases select their voltage references. As a result, no phases with a short pulse width are detected, solving the problem of a current detection error or operation error. The noise generation due to the decrease in the carrier and the increase in current ripple can also be prevented. In addition, the system can be configured with a minimum of one A/D converter only, increasing the freedom in microcomputer selection or circuit board design.

It is also possible to carry on, at the same time, the correction of the already-known pulse (for example, a technique described in Japanese Patent Application No. 2006-315120) for the current of the phase to be detected. Combining this technique with the present invention, only one phase is required for the correction, therefore the increase in current distortion and deterioration of accuracy can be prevented.

According to the present invention, an error of phase in the detection process can be kept minimal, and a stable motor drive even in a high-speed region can be achieved.

It is also possible to detect only the current of the phase having the largest value, replace the current of at least one phase of the others with a voltage reference value, and calculate the current of the last phase from the detected value and the current reference value.

Third Embodiment

Figure 8:
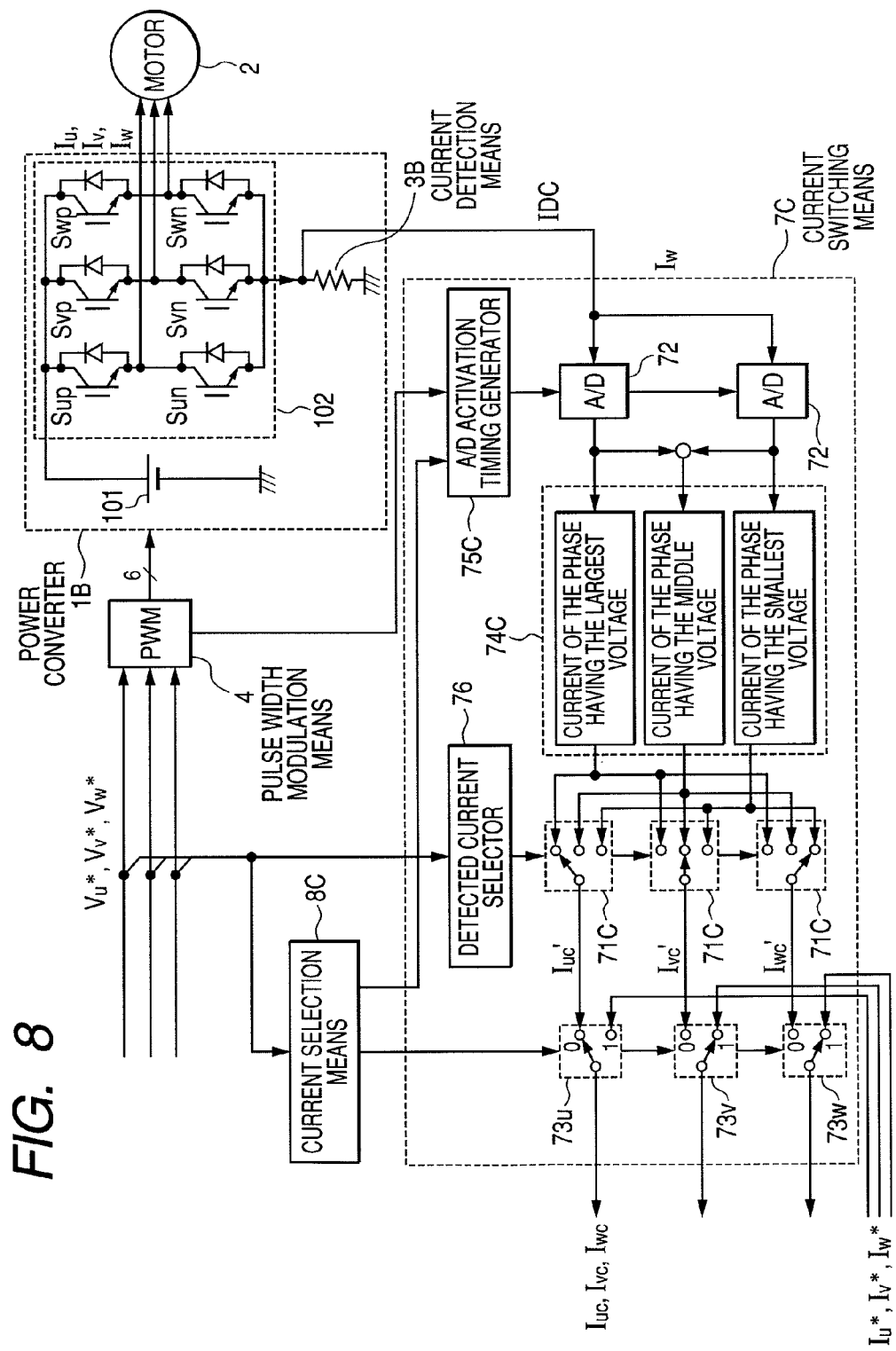
FIG. 8 is a block diagram of Embodiment 3.

The block diagram of FIG. 8 describes a third embodiment of the present invention. The current switching means 7B in FIG. 6 is replace with a current switching means 7C, and the current selection means 8B with 8C. The rest of the configuration is the same as FIG. 6, except that some blocks are not shown.

In the same manner as described in FIG. 6, the system in this embodiment detects the DC bus current in order to detect phase currents. The difference in this embodiment compared to the one in FIG. 6 is to allow the conventional method of two phase current detection from the DC bus current when the pulse widths of the two phase currents are long enough, or else, to use a current reference in place of a detected current only when one of the pulse widths is too short for valid detection.

In FIG. 8, two A/D converters 72 detect currents of two phases in the DC bus current during a half cycle of the carrier wave based on the principle described in FIG. 7. The A/C converters are triggered by an A/D activation timing generator 75C. By using the two A/D converters, the current value of the phase having the largest voltage and the current value of the phase having the smallest voltage are detected, and from the two values, the current value of the last phase having the middle voltage is calculated. These detected current values are stored in three memories 74C.

A detected current selector 76 determines which phase corresponds to each of the values in the memories based on the magnitude of voltage references, and switches switches 71C to obtain currents $I_{uc}'$, $I_{vc}'$, and $I_{wc}'$. Lastly, the current selection means 8C evaluates whether to use the detected current value or current reference value, and determines current values $I_{uc}$, $I_{vc}$, and $I_{wc}$ to use within the controller. The current selection means 8C calculates the shortest pulse width based on the magnitude of the voltage references for the three-phases. If the actual phase current is determined as having a valid condition for detection, the current selection means 8C turns all the detected-value/reference switches to "0" to perform the conventional calculation of reconstructing the AC currents from the DC bus current. On the contrary, if it is determined that the pulse width is too short for accurate detection of the current value, the current selection means 8C switches the detected-value/reference switch for the phase to "1" and let the AC reference be used.

Regarding the condition for the above determination, it is most reasonable to make the determination based on the magnitude relation of voltage references; however, for example, the percentage modulation, motor drive frequency, or magnitude of current references may be used in making the determination since they are closely related to the pulse width. For instance, the pulse width will be short if the motor drive frequency is low and the current reference is low.

According to the present invention, a conventional current detection, in which the DC bus current is directly detected, can be performed in a region having a long pulse width, consequently keeping the conventional accuracy of current control, and at the same time, the deterioration of performance (increase in electromagnetic noise or current ripple) in a low-speed region can be avoided.

Fourth Embodiment

Figure 9:
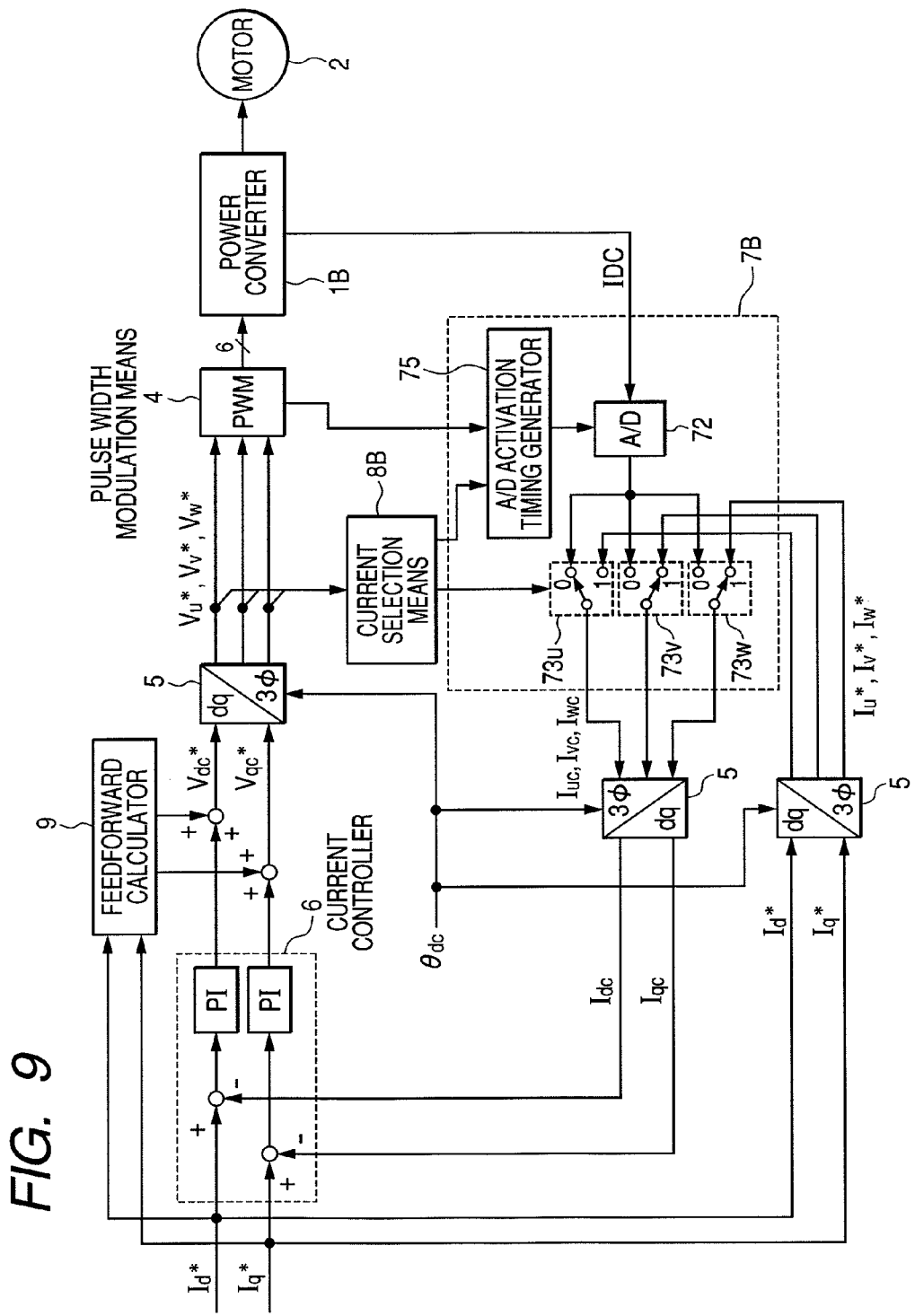
FIG. 9 is a block diagram of Embodiment 4.

The block diagram of FIG. 9 describes a forth embodiment of the present invention. In FIG. 9, a feedforward calculator 9 is added to the configuration of FIG. 6, the feedforward calculator 9 is a block for directly calculating, from current references $I_c^*$ and $I_q^*$, the voltages applied to the motor. The rest of the configuration is the same as FIG. 6.

The feedforward calculator 9 directly calculates voltage references through an inverse model calculation of a motor. The main characteristic of the present invention, as described in the previous embodiments, is to use a current reference in place of a detected current value. This means that the phase for which the current reference is used is under no control. A change in reference $I_d^*$ or $I_q^*$ may not be reflected in the voltage reference for the phase. This results in an error, but since "the current of at least one phase" has been detected as described above, the error is eventually corrected by the operation of the current controller 6. Unfortunately, it takes some response time to reach to the point.

In this embodiment, the voltage references are calculated, as feedforward, from current references $I_d^*$ and $I_q^*$ by the inverse model calculation of the motor, so that a response characteristic is improved as a result.

According to this embodiment, the motor drive system with an improved transient response characteristic can be achieved. The feedforward calculator 9 in this embodiment may be used in combination with the systems described in the other embodiments (e.g. FIG. 1 or FIG. 8) without any problems.

Fifth Embodiment

Figure 10:
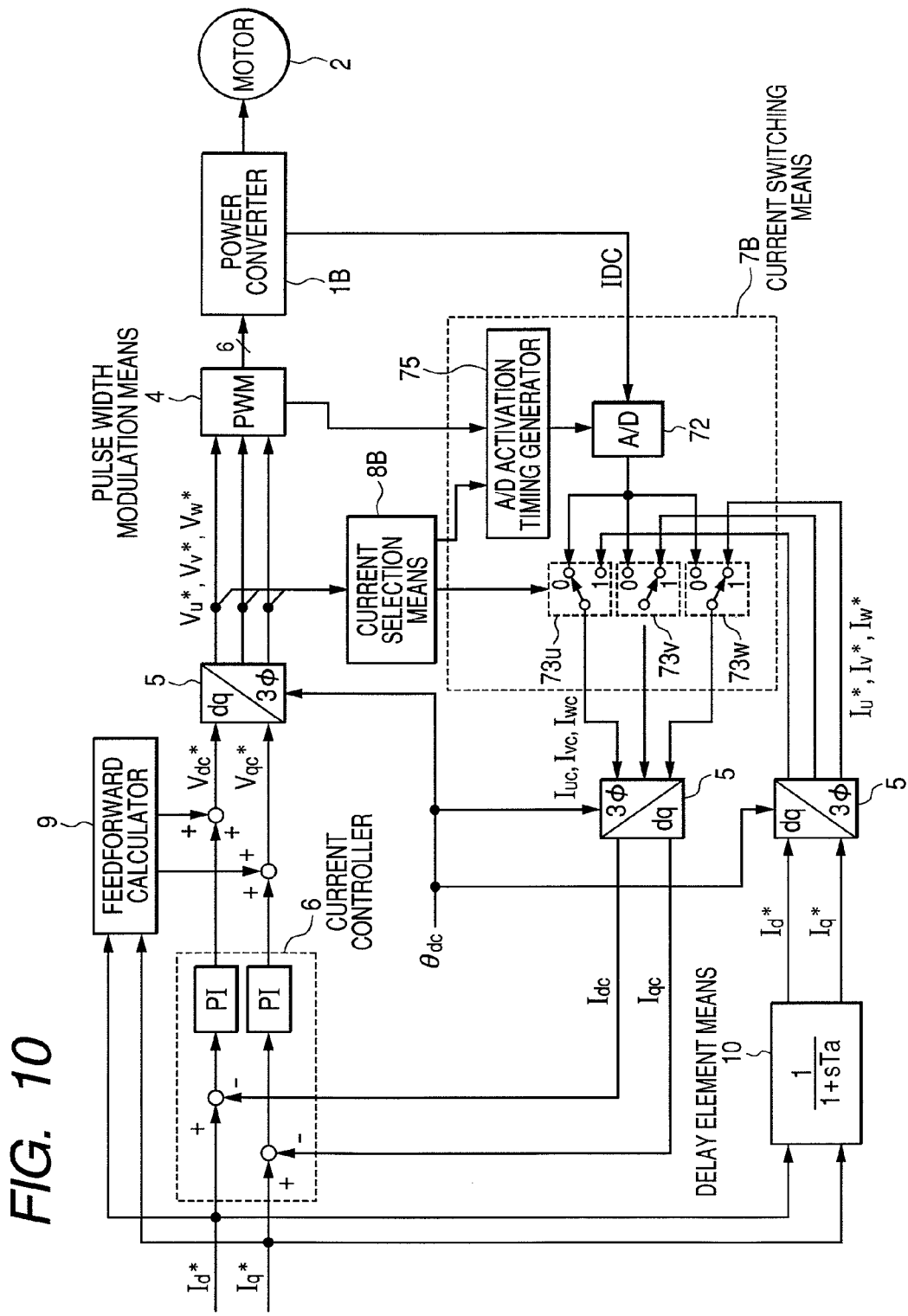
FIG. 10 is a block diagram of Embodiment 5.

The block diagram of FIG. 10 describes a fifth embodiment of the present invention. The configuration of FIG. 9 is partially modified in FIG. 10. In FIG. 10, compared to FIG. 9, current references $I_d^*$ and $I_q^*$ pass through a delay element means 10 to generate alternating current references $I_u^*$, $I_v^*$, and $I_w^*$ used in place of current detected values.

As described in the previous embodiments, the main characteristic of the present invention is to detect, when detecting three-phase alternating current, not all currents of the three phases but only a part (current of at least one phase) of them, replacing the currents of the other phases with references.

In such a configuration, the detected current normally includes a "delay" element in the response, the "delay" element generated by electric transient phenomena; but the current reference has no such delay element.

As a result, a change in the current reference may create inconsistency in behavior between the detected current and the reference, possibly generating unnecessary oscillation. To solve this problem, the delay element means 10 is intentionally provided in this embodiment (FIG. 10) for the current reference to be used in place of the detected phase current. As a result, all three phases are balanced to achieve a stable system. No oscillation occurs during a transient period, and the system quality is significantly improved.

In particular, while it is the simplest way to use a first order lag as the delay element means, the means should be chosen according to the design method of the current controller. When using the first order lag, constant number Ta should be set according to the control response time of the current controller 6, so that all feedbacks from three phases (including the phase whose actual current is detected and the phase created from a current reference) will change with the same time constant in principle, keeping a good transient balance among the three phases. Such a response is ideal.

The delay element 10 in this embodiment may be combined with the systems described in the other embodiments (e.g. FIG. 1 or FIG. 8) without any problems.

Sixth Embodiment

Figure 11:
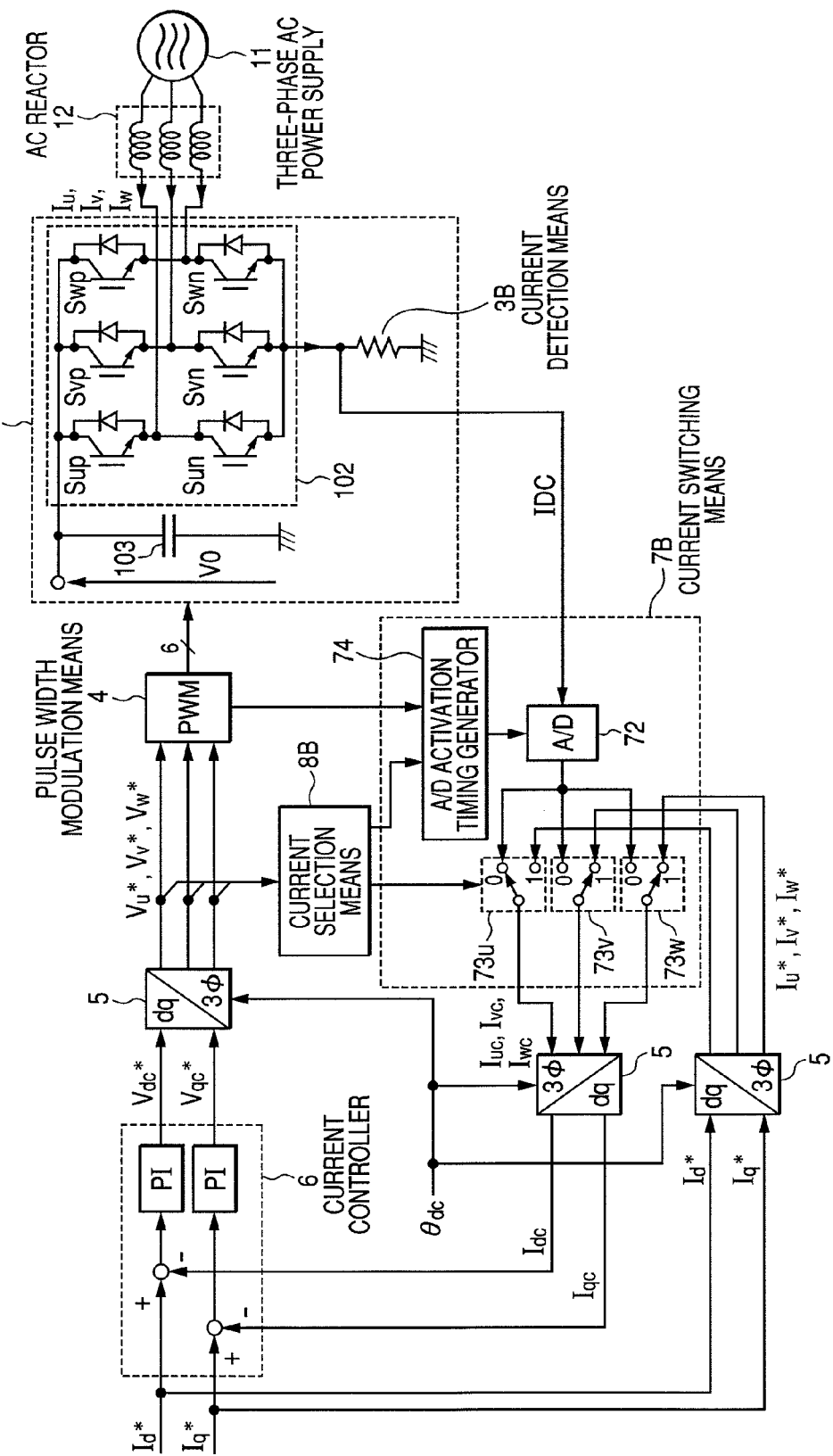
FIG. 11 is a block diagram of Embodiment 6.

The block diagram of FIG. 11 describes a sixth embodiment of the present invention. In this embodiment, the motor drive systems in the previous embodiments are applied to a power supply AC-DC converter system.

The system in FIG. 11 comprises a power converter 1D and its control parts; the power converter 1D converts, to DC, from the AC inputted from a three-phase AC power supply 11 via an AC reactor 12.

The overall flow of the system is the same as the previous embodiments except that the power supply 11 and the reactor 12 are connected in place of a motor. DC voltage output V0 in the power converter 1D is the target of control in this system.

The power converter 1D has the same basic configuration as the previously described power converter 1B, except that a smoothing capacitor 103 instead of a power supply is connected in the DC side. An object of this system is to automatically adjust the DC voltage occurring here.

Operations for detecting currents in this embodiment are the same as the operations described in the previous embodiments for a motor. Each method in the embodiments 1 to 5 is applicable to this system. This system will function if current reference $I_q^*$ is provided to match the DC voltage V0 to a predetermined value. In the same manner as described in the previous embodiments, the problems, such as the imbalance of three phases due to a sampling error or the detection error in one shunt current detection, are solved by using the current reference values in place of the detected current values. Therefore, a high-performance power supply AC-DC converter system can be achieved.

Seventh Embodiment

Figure 12:
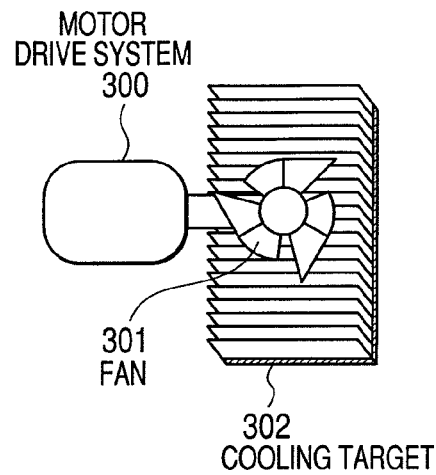
FIG. 12 is an example schematic diagram of a fan according to the present invention.

The block diagram of FIG. 12 describes a seventh embodiment of the present invention. FIG. 12 is a schematic view in which a motor drive system 300 in the present invention is applied to a drive of a fan 301. The motor drive system 300 has a configuration corresponding to the motor drive systems described in the first to forth embodiments. By driving the fan 301, a cooling target 302 such as a radiator fin or a heat exchanger is cooled or dust is collected using a dust collection filter.

According to this embodiment, the system can be constructed with a minimum of one A/D converter, improving torque performance with a low-cost microcomputer over a conventional system. In addition, this system can also prevent performance deterioration, e.g. an increase in electromagnetic noise in a low-speed region or an increase in current ripple.

Eighth Embodiment

Figure 13:
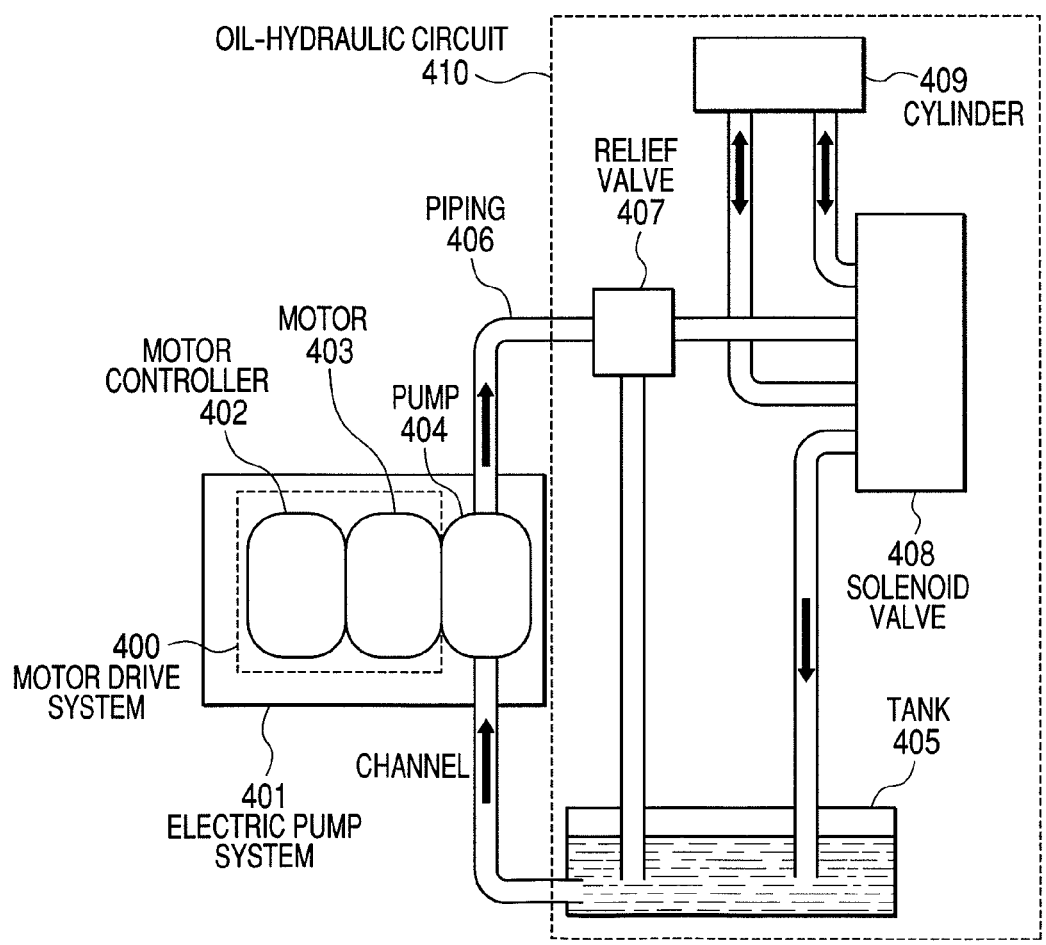
FIG. 13 is an example schematic diagram of an electric pump system according to the present invention.

The block diagram of FIG. 13 describes an eighth embodiment of the present invention. FIG. 13 is a schematic view in which a motor drive system 400 in the present invention is applied to an electric pump system 401. The motor drive system 400 corresponds to the motor drive systems described in the first and second embodiments. It comprises a motor controller 402, which includes a power converter 1, and a motor 403, which drives a pump 404. The motor drive system 400 and the pump 404 are put together into the electric pump system 401. The pump 404 may be either a water pump or an oil pump. When the pump 404 is an oil-hydraulic pump, it is connected to an oil-hydraulic circuit 410 with a piping 406. The oil-hydraulic circuit 410 comprises a relief valve 407 for keeping the oil pressure under a set value, a solenoid valve 408 for switching the oil-hydraulic circuit, a cylinder 409 which operates as a hydraulic actuator, and a tank 405 for storing oil. The oil-hydraulic pump is used to pump pressure oil (oil with a high pressure) operated by hydraulic units such as the hydraulic actuator. The motor drive system 400 is the drive source for the pump.

In the oil-hydraulic circuit, the load of the pump 404 is changed by the switch of the circuit by the solenoid valve 408, which creates a load disturbance in the motor drive system 400. This embodiment can achieve excellent torque response performance against such a load disturbance using only a low-cost microcomputer. In addition, this system can also prevent performance deterioration, e.g. an increase in electromagnetic noise in a low-speed region or an increase in current ripple.

Ninth Embodiment

Figure 14:
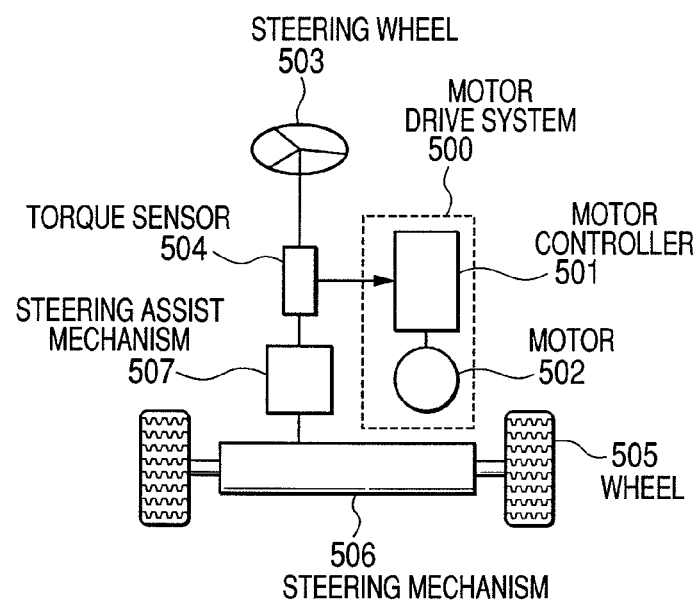
FIG. 14 is an example schematic diagram of a power steering according to the present invention.

The block diagram of FIG. 14 describes a ninth embodiment of the present invention. FIG. 14 is a schematic view in which a motor drive system 500 in the present invention is applied to a steering assist mechanism of a vehicle, generally called a power steering. The motor drive system 500 corresponds to the motor drive systems described in the first and second embodiments. It comprises a motor controller 501, which includes a power converter 1, and a motor 502. The steering assist mechanism detects an assist force from the steering angle of a steering wheel 503 with a torque sensor 504, and inputs it to the motor drive system 500. The motor drive system drives the motor 502 based on the assist force, which is passed on to a steering assist mechanism 507. The steering assist mechanism 507 actuates a steering mechanism 506 which operates wheels 505.

The steering mechanism 506 can achieve high steering performance by operating the wheels 505 with an excellent response to the steering angle of the steering wheel 503. According to this embodiment, the steering assist mechanism 507 can be controlled with enough torque response, achieving high steering performance. In addition, this system can also prevent performance deterioration, e.g. an increase in electromagnetic noise in a low-speed region or an increase in current ripple.

Tenth Embodiment

Figure 15:
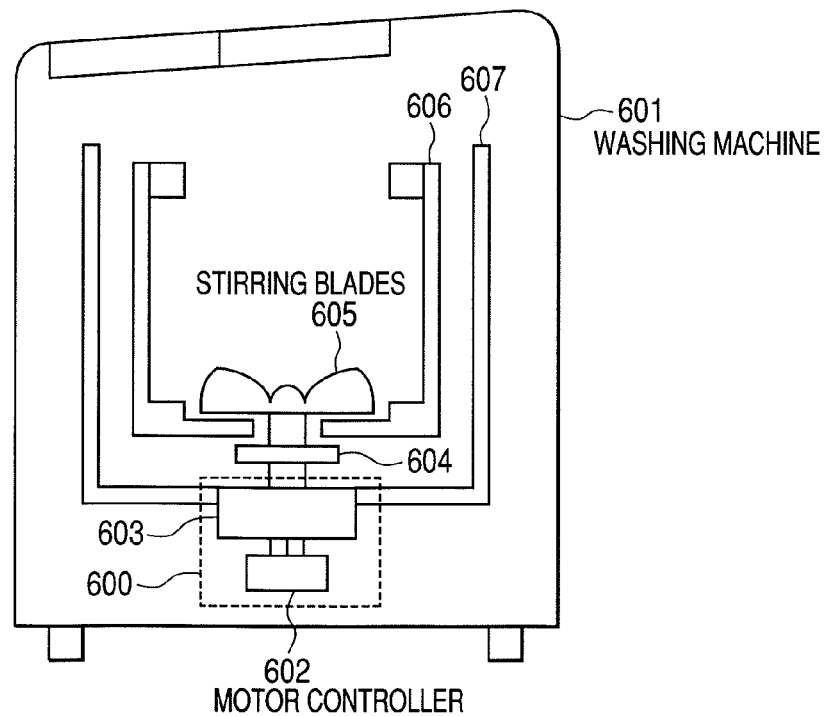
FIG. 15 is an example schematic diagram of a washing machine according to the present invention.

The block diagram of FIG. 15 describes a tenth embodiment of the present invention. FIG. 15 is a schematic view in which a motor drive system 600 in the present invention is applied to a washing machine 601. The motor drive system 600 corresponds to the motor drive systems described in the first and second embodiments. It comprises a motor controller 602, which includes a power converter 1, and a drive motor 603. The washing machine 601 comprises a water receiving tank 607, a washing tank 606, and stirring blades 605 (pulsator); both the washing tank 606 and the stirring blades 605 are positioned in the water receiving tank 607. The drive motor 603 drives the washing tank 606 and the stirring blades 605. A clutch 604 switches the drive between the washing tank 606 and the stirring blades 605 during a washing process. The clutch 604 may be either with or without a speed reduction mechanism.

One of the characteristics of a washing machine is a major change in the load torque and moment of inertia. This is because of the washing process which is broadly divided into "washing", "rinsing", "spinning", and "drying", and a variation in the load amount and fabric material. According to this embodiment, the system can well respond to such changes as the change in the load torque, allowing the machine to improve the washing performance or to reduce the washing time. In addition, this system can prevent performance deterioration, e.g. an increase in electromagnetic noise in a low-speed region or an increase in current ripple. Controlling these can be effective in a noise reduction during the wash process.

Eleventh Embodiment

Figure 16:
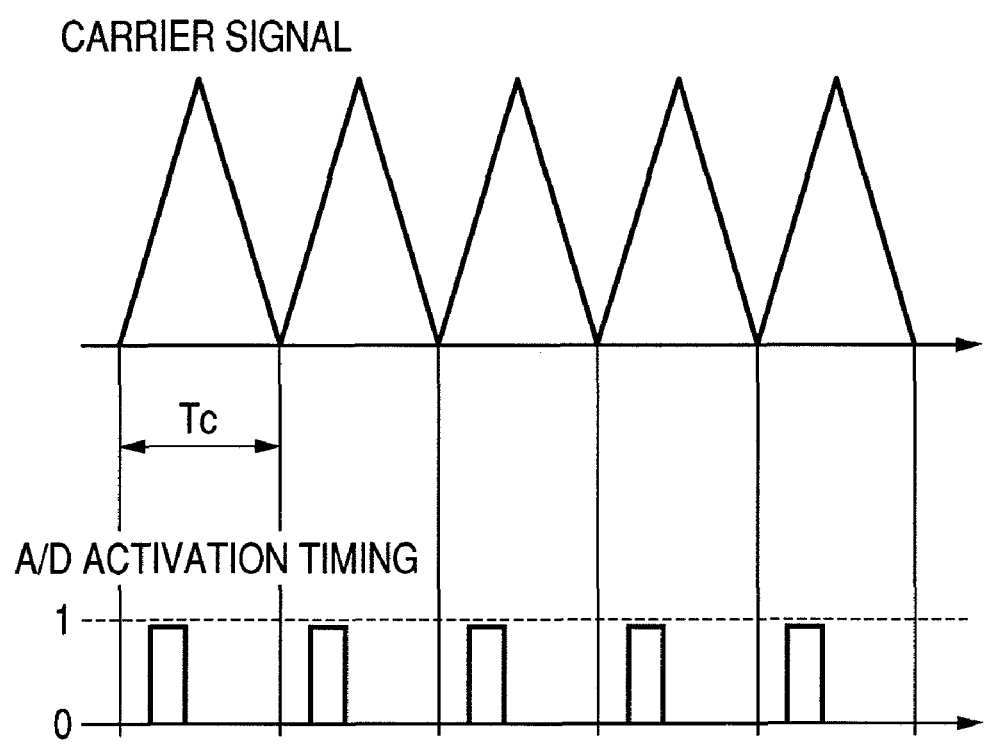
FIG. 16 is an activation timing diagram for an A/D converter.

An eleventh embodiment of the present invention is described below. The system in this embodiment is provided with at least either of the means for detecting current in an AC side of a power converter or the current detection means for detecting a DC bus current, which are described in the block diagrams of the first to tenth embodiments; and also provided with an A/D converter as the current detection means. FIG. 16 is a relationship diagram showing a triangle-wave carrier signal and activation timings of the A/D converter. The A/D converter is activated not more than once during each cycle Tc of the carrier signal, at the time of detection of the current of the phase having the largest absolute value of applied phase voltage. The phase having the largest absolute value changes every 60° for a cycle of an electric angle in the same manner as the voltage references shown in FIG. 2. Therefore, this 60° period is suitable for activating the A/D converter to detect a current of a single phase. The applied phase voltage here is the AC voltage outputted by the power converter, and the power converter is driven by the gate pulse signal obtained by PWM modulation with voltage references $V_u^*$, $V_v^*$, and $V_w^*$, and a carrier signal. The AC voltage outputted by the power converter has a comb-like waveform due to the PWM modulation; however, if a high frequency component more than the carrier wave frequency f,c is deleted through a low-pass filter (LPF), etc., its waveform will approximately match the AC voltage reference.

Next describes the case of a load disturbance input. If a load disturbance is inputted into the power converter, the AC current outputted by the power converter will vary according to the disturbance. This AC current is controlled by an operation of the current controller to follow the current reference value.

The system according to this embodiment can be configured with only one A/D converter, making the system inexpensive, whereas in the conventional method, two expensive converters have been used. In addition, this system creates no current detection errors caused by the sampling timing lag shown in FIG. 3, and can control AC current against a load disturbance to be operable even at a high-speed drive frequency.

What is claimed is:
1. A semiconductor power converter comprising:
   a power converter for converting direct current to three-phase alternating current or vice versa;
   a means for detecting a current in an alternating current side of the power converter;

a means for providing a current reference in the alternating current side of the power converter;

a current controller for calculating a voltage reference in the alternating current side of the power converter to match the current reference and a value of the detected current; and a pulse width modulation means for controlling the power converter through pulse width modulation based on the voltage reference, wherein, the current reference is used in place of the value of the detected current for at least one phase current among three phase currents in the alternating current side.

2. The semiconductor power converter according to claim 1, wherein the semiconductor power converter is provided with a feedforward calculator for directly calculating the voltage reference in the alternating current side of the power converter from the current reference and adding the calculated value to an output of the current controller.

3. The semiconductor power converter according to claim 1, wherein the semiconductor power converter uses the current reference obtained through a delay element when using the current reference in place of the detected current value.

4. The semiconductor power converter according to claim 3, wherein a first order lag element is used as the delay element, and a time constant of the first order lag element corresponds to a control response time of the current controller.

5. The semiconductor power converter according to claim 1, wherein the semiconductor power converter compares absolute values of the voltage references for each phase as a basis for selecting the phase for which the current reference is used in place of the detected current value, and selects at least one phase from two phases other than the phase having the largest absolute value.

6. A motor drive system comprising: a three-phase alternating current motor, a load unit driven by the motor, and the semiconductor power converter according to claim 1 for driving the motor.

7. The motor drive system according to claim 6, wherein the load unit is a fan; an electric pump; a steering assist mechanism for a vehicle; or a stirring fan or washing tank of a washing machine or washing dryer.

8. A semiconductor power converter comprising:
a power converter for converting direct current to three-phase alternating current or vice versa;
a means for detecting a DC bus current of the power converter;
a means for detecting a current value in an alternating current side of the power converter through a calculation process based on the DC bus current;
a means for providing a current reference in the alternating current side of the power converter;
a current controller for calculating a voltage reference in the alternating current side of the power converter to match the current reference and the detected current value; and
a pulse width modulation means for controlling the power converter through pulse width modulation based on the voltage reference,
wherein, the current reference is used in place of the detected current value for a current of at least one phase other than a phase having a maximum absolute value of the voltage reference among currents in the alternating current side obtained through the calculation process based on the DC bus current.

9. The semiconductor power converter according to claim 8, wherein the semiconductor power converter is provided with a means for determining whether to use the detected current value or the current reference in place of the detected current value, based on either one of the voltage reference, voltage percentage modulation, motor drive frequency, or magnitude of the current reference, and switching accordingly when the current reference is used in place of the detected current value.

10. The semiconductor power converter according to claim 8, wherein the semiconductor power converter is provided with a feedforward calculator for directly calculating the voltage reference in the alternating current side of the power converter from the current reference and adding the calculated value to an output of the current controller.

11. The semiconductor power converter according to claim 8, wherein the semiconductor power converter uses the current reference obtained through a delay element when the current reference is used in place of the detected current value.

12. The semiconductor power converter according to claim 11, wherein a first order lag element is used as the delay element, and a time constant of the first order lag element corresponds to a control response time of the current controller.

13. A motor drive system comprising: a three-phase alternating current motor, a load unit driven by the motor, and the semiconductor power converter according to claim 11 for driving the motor.

14. The motor drive system according to claim 13, wherein the load unit is a fan; an electric pump; a steering assist mechanism for a vehicle; or a stirring fan or washing tank of a washing machine or washing dryer.

15. A semiconductor power converter comprising:
a power converter for converting direct current to three-phase alternating current or vice versa;
a controller for controlling the power converter; and
at least one of a means for detecting a current in an alternating current side of the power converter or a means for detecting a DC bus current in the power converter;
wherein, the semiconductor power converter is provided with an A/D converter as a means for acquiring current information from the current detection means;
the A/D converter is activated not more than once for a cycle of pulse width modulation to detect only a phase having a largest absolute value of applied phase voltage among three phases; and
the alternating current is controlled within a predetermined value in a case of load disturbance in the semiconductor power converter.

16. A semiconductor power converter comprising:
a power converter for converting direct current to three-phase alternating current or vice versa;
a means for detecting a current in an alternating current side of the power converter;
a means for providing a current reference in the alternating current side of the power converter;
a current controller for calculating a voltage reference in the alternating current side of the power converter to match the current reference and a value of the detected current; and
a pulse width modulation means for controlling the power converter through pulse width modulation based on the voltage reference,
wherein, for the values of the detected currents of three phases used in the current controller, the value detected by the current detection means is used for one phase, and the current reference is used for at least one of the other phases.

* * * * *